United States Patent [19]

Sicha et al.

[11] 4,181,410

[45] Jan. 1, 1980

[54] METHOD AND APPARATUS FOR AUTOMATIC IMPLEMENTATION OF FADE-IN, FADE-OUT AND FADE-OVER RECORDING EFFECTS ON FILM

[75] Inventors: Horst Sicha, Nellingen; Dieter Wezel, Stuttgart; Helmut Rube, Grunbach; Wolfgang Riedel, Winnenden; Gerd Mattes, Schorndorf; Gerhard Borner, Waldenburg, all of Fed. Rep. of Germany

[73] Assignee: Robert Bosch GmbH, Stuttgart, Fed. Rep. of Germany

[21] Appl. No.: 877,352

[22] Filed: Feb. 13, 1978

[30] Foreign Application Priority Data

Feb. 17, 1977 [DE] Fed. Rep. of Germany ....... 2706761
Oct. 26, 1977 [DE] Fed. Rep. of Germany ....... 2747889

[51] Int. Cl.² ............................................ G03B 21/36
[52] U.S. Cl. .............................. 352/91 R; 235/92 MP; 235/92 CT
[58] Field of Search ........ 235/92 CT, 92 MP, 92 DP; 360/78, 80; 352/91 R, 91 C, 91 S

[56] References Cited

U.S. PATENT DOCUMENTS

| 2,517,250 | 8/1950 | Shea et al. | 352/91 R |
| 3,364,306 | 1/1968 | Brown | 352/91 R |
| 3,935,434 | 1/1976 | Rice | 235/92 CT |

*Primary Examiner*—Joseph M. Thesz
*Attorney, Agent, or Firm*—Michael J. Striker

[57] ABSTRACT

The operator projects motion-picture film using a projector. A counter counts frame pulses during both forwards and reverse film transport, and thereby keeps track at all times of the film frame count. The operator during forwards projection when he sees the start or end of a scene pressss a storage switch which causes the scene-start or scene-end frame count to be stored. The operator also preselects the type of recording-transition effect to be implemented. The operator then commands dubbing of the scene, whereupon a minicomputer begins to automatically implement a series of operations, including projector motor control and recording control, to implement the selected recording-transition effect, in a programmed manner dependent upon the stored frame counts and the instantaneous frame count. In the middle of the dubbing of a scene, the operator can change the transition effect he selects, to produce a transition effect at the scene end different from that selected for the scene start.

28 Claims, 19 Drawing Figures

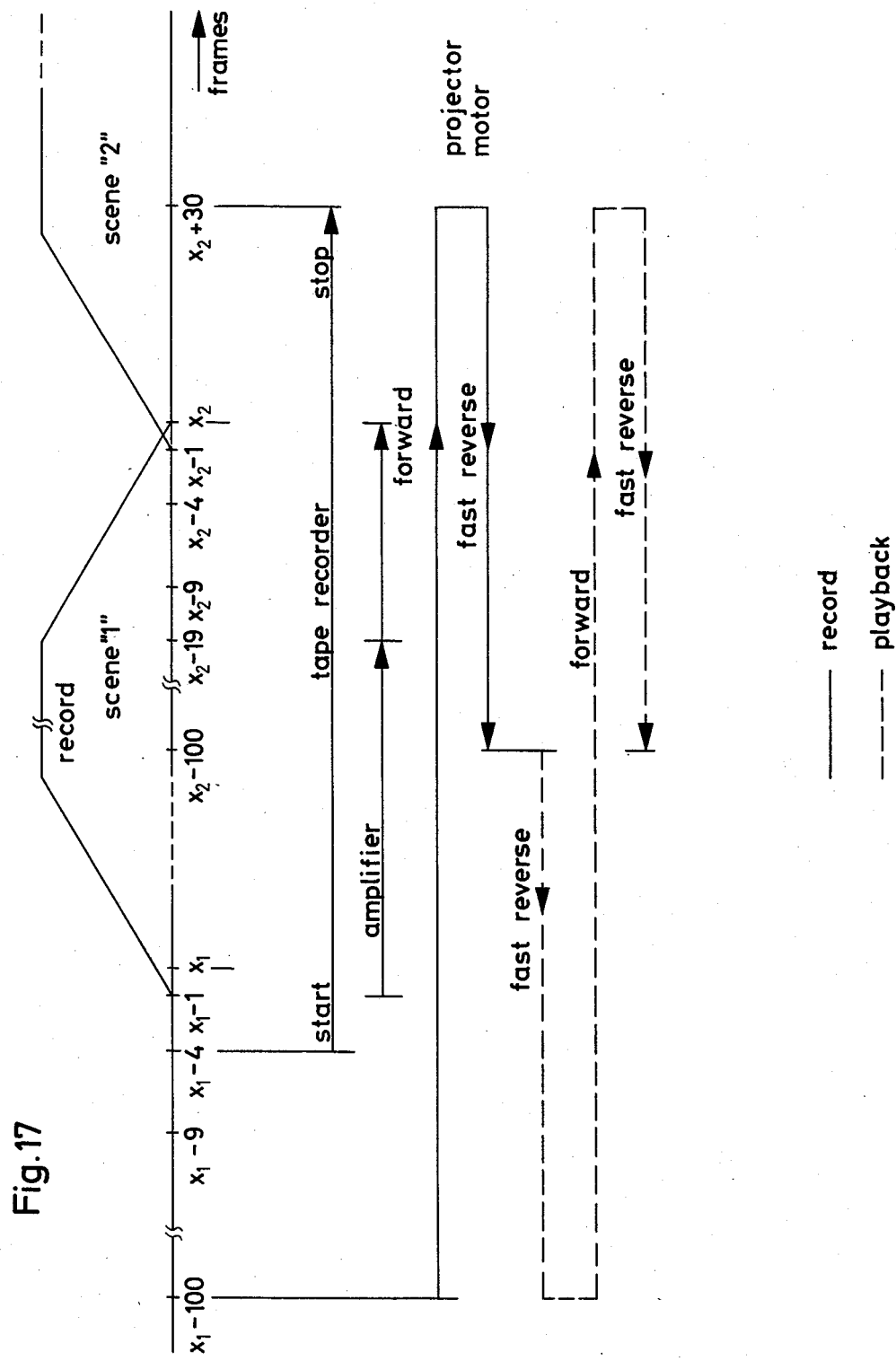

METHOD AND APPARATUS FOR AUTOMATIC IMPLEMENTATION OF FADE-IN, FADE-OUT AND FADE-OVER RECORDING EFFECTS ON FILM

BACKGROUND OF THE INVENTION

The present invention relates, for example, to the dubbing or rerecording of sound motion-picture film, and especially for example to problems such as the implementation of transitional effects such as audio fade-in, fade-out or fadeover at scene-transition locations on such film, and the like.

German patent No. 1,221,556 discloses a soundfilm reproduction machine provided with a forwards-backwards frame (or film-increment) counter. When the operator switches the machine to reverse transport, the counter begins to count until the operator terminates transport. When the operator now switches to forwards transport, the forwards transport is automatically terminated when the count has gone back down to its original value, i.e., when the film has been returned to the location at which the reverse transport began. Thus, if the operator has switched to reverse transport after locating for example the start of a scene, then during the subsequent forwards transport the machine automatically cues in to the scene-start location, facilitating dubbing or rerecording work. When the scene-start location is automatically reached in this way, an audio playback machine may be switched on. Typically, the audio playback machine is switched on in advance of the switch-on of the recording system of the film reproduction machine, by a time interval corresponding to a predetermined number of film frames. Using this apparatus, the film can be dubbed or rerecorded scene by scene in a fairly exact manner, without gaps in the audio recording to accompany the film, and without erasure of audio recording accompanying individual scenes when dubbing adjoining scenes.

This known arrangement is not well suited for the production of more sophisticated recording-transition effects, such as audio fade-in, fade-out or fadeover at scene transition locations on the film, particularly gradual transition effects. To implement effects such as these, the operator must be quite alert and skillful. For example, to implement a recording fade-in at the start of a scene followed by a fade-out at the end of a scene, the operator must very carefully follow the course of the scene and use both hands to appropriately bring up and bring down the recording level at the proper times, using subjective skill and judgement. Very often, the results are not satisfactory or convincing, and the dubbing of the scene must be done over and over. The operator's skill is even more greatly challenged when he must, in particular, implement a recording fadeover effect at a scene-transition location, especially for example when the scene-transition location on the film itself is constituted by an image fadeover. In that event, it is very difficult to produce a recording fadeover effect which satisfactorily and convincingly matches the image fadeover effect across which the dubbing is to be performed.

Published German allowed patent application DT-AS No. 2,417,547 discloses a somewhat different system. This system is more directly capable of cueing in a preselected location on the film. The operator is able to ascertain, before any dubbing work, the scene-transition locations, which the system is then capable of cueing in automatically. However, with respect to the dubbing work per se, the demands placed upon the alertness and skill of the operator are just as high as with the other prior-art system discussed above. Additionally, when first ascertaining the scene-transition locations, the operator must manually advance the film forwards and backwards, until a transition location is being projected. This is laborious and inconvenient, and compounded by the fact that the projection light must be reduced when the operator is slowly and manually effecting film transport in the projector, i.e., to avoid damage to the film.

SUMMARY OF THE INVENTION

The method and apparatus of the present invention are such that the operator can effect the storage of frame counts corresponding to desired recording-transition locations on the film (identical, for example, to scene-transition locations on the film) by pressing a store button. The operator can press the store button during normal-speed film projection, i.e., he does not need to manually position a transition-location frame at the projection window, and the reaction time of the operator is automatically taken into account. In this way, the operator readily effects storage of transition-location frame counts. The operator also preselects from among different types of recording-transition effects, such as audio fade-in, fade-out or fadeover. After this preliminary decision-making, the operator initiates automatic operation, and a minicomputer effects the requisite transport and recording-control operations in the correct sequence.

If the operator wishes, he can dub or record on a scene-by scene basis, stopping after each scene. If the operator has available two audio sources, such as two playback machines, he can effect the storage of all transition-location frame counts and can preselect the recording-transition effect desired for each transition location on the film, and then switch over to automatic operation whereupon the minicomputer automatically implements all requisite operations without interruption of forwards film transport. When the operator selects an operating mode in which film transport is stopped after each scene, the transport is stopped at a time when the transition location just finished on the film is located at a portion of the machine where it is accessible for the application of a cutting mark or for actual cutting.

When the transition locations of interest have been ascertained and their frame counts stored, e.g., those at the start and end of one scene, or all those on the entire film, the operator switches into reverse transport, and the minicomputer recognizes the situation and causes the reverse transport to be effected at high speed, and then causes the transport to be stopped at a film location previous to the start of the scene or first scene of interest. At the same time the system automatically terminates the command for high-speed transport. In this way it is assured that when the subsequent switchover to forwards transport is effected, i.e., so that the dubbing can actually start, the forwards transport will not be performed at high speed and thus the dubbing not improperly performed. However, in general, the reverse transport is performed at normal speed, and high-speed reverse transport is selected automatically only when the system ascertains that this is appropriate for the step thus far reached in the work sequence.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIGS. 15-17 are graphical depictions of the operations performed when implementing three different types of recording-transition effects, namely fadeover, hard fade-in and fade-out, and soft fade-in and fade-out, respectively.

DESCRIPTION OF THE PREFERRED EMBODIMENTS

First Embodiment

Figure 1:
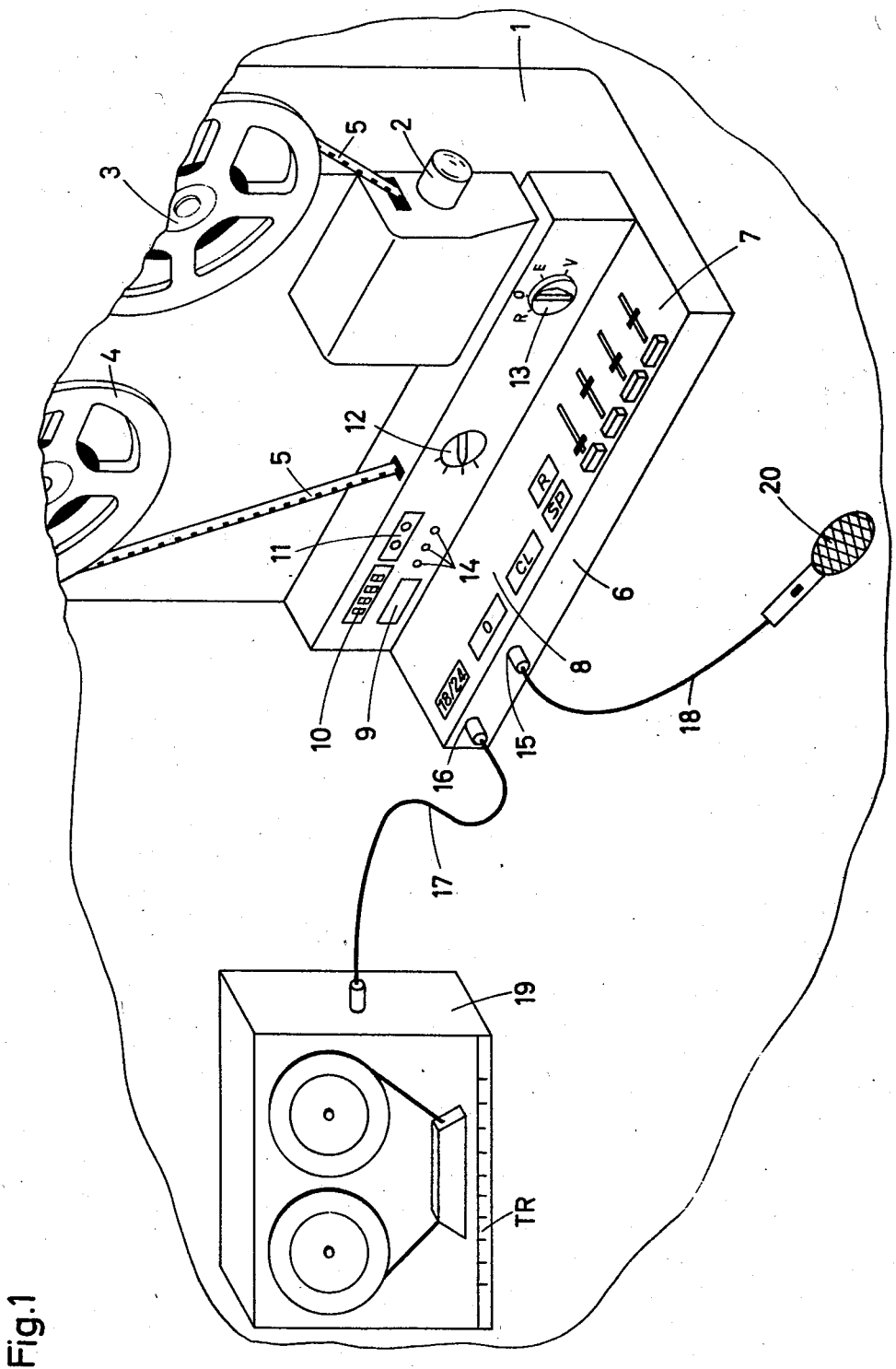
FIG. 1 is a perspective view of an interconnected sound-film projector, a magnetic-tape playback machine and a microphone, i.e., a set-up to be employed for dubbing or rerecording work.

A sound film projector 1 having an objective 2 and film reels 3, 4 serves as the playback machine for a sound motion picture film 5. The projector 1 has a control panel 6, subdivided into a mixing panel 7 for manual control of the recording and playback amplifier of the projector 1, and a command panel 8 provided with a series of operation switches. Above the control panel 6, on a vertical wall of the projector 1, there is provided a viewing window 9 for a sound-level indicator, a viewing window 10 for the indicator of a frame counter, a viewing window 11 for a film transport speed indicator (frames per second), a selector switch 12, a central switch 13 (ZS) and a scene-position indicator 14. At the front narrow vertical surface of the control panel 6, there are provided two inputs 15, 16 into which can be plugged a rerecording cable 17 and a microphone cable 18. By means of these cables, a magnetic-tape playback machine 19 (TR) and a microphone 20 can be operatively connected to the sound film projector 1.

Figure 2:
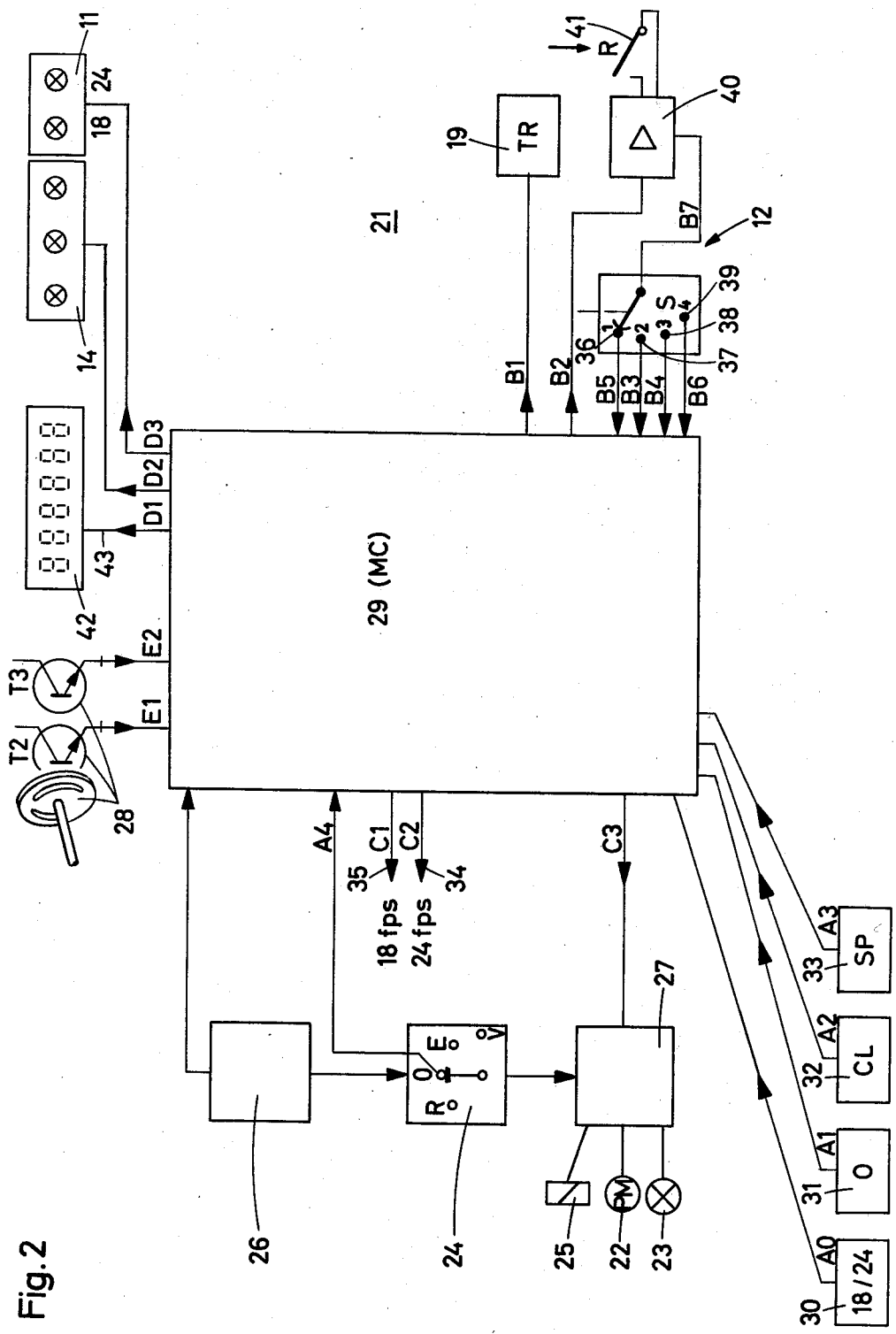
FIG. 2 is a block schematic diagram of the minicomputer of the projector and of its other control and command components.

FIG. 2 depicts components internal to the projector 1. These include a projector motor 22 (PM), a projection lamp 23, a central switching and control unit 24 cooperating with the central switch 13 (ZS) of FIG. 1, for adjusting mechanical units of the projector such as the film-loop former, the film guide or pressing plate, and the like, and a switching magnet 25 controlled by the central switching and control unit 24 and energized by a current source 26.

A switching unit 27 serves to implement the remaining, computer-coupled control of the projector motor 22, the lamp 23 and the switching magnet 25. Additionally, the projector 1 includes a pulse generator 28 which in conventional manner includes an electric eye and generates frame or length-increment pulses during both forward and reverse film transport. The projector 1 further includes, as its central switching unit, a minicomputer 29 (MC). The zero or starting-state setting of unit 13, 24 is coupled into minicomputer 29 via input A4 of the latter. The pulse generator 28 applies pulses to the inputs E1 and E2 of the minicomputer 29. Additionally, the minicomputer 29, via its input A0, A1, A2, A3, is connected to the operation switches of the command panel 8. These command switches command the following operations: switch 30 (18/24) film transport speed changeover; switch 31 (O) resetting of the frame-counter indicator to zero; switch 32 (CL) erase stored count; switch 33 (SP) store in the memory unit of minicomputer 29 the current frame count, two such frame counts being capable of being stored.

The minicomputer 29 regulates the rotary speed of the projector motor 22 (PM) via lines 34 and 35, from outputs C1 and C2. The selector switch 12 has four settings 36-39 for the inputs B3, B4, B5, B6 of the minicomputer 29. These inputs B3-B6 are respectively associated with the commands "fadeover," "soft fade-in," "hard fade-in" and "fade-out." An audio amplifier 40 is connected to the minicomputer 29 via B2 and B7, B2 being the output of the minicomputer 29 for recording and B7, in conjunction with B3 or B4 or B5 or B6, being the input into the minicomputer 29.

The audio amplifier 40 is also connected to a command switch 41 (R) for operation "record." A frame counter 42 is connected to an output D1 of the minicomputer 29 via a driver stage 43. The outputs D2 and D3 are connected to lamps of the film transport speed indicator (11) and scene-position indicator 14. The output B1 of the minicomputer 29 is connected to the magnetic-tape playback machine 19.

Figure 4A:
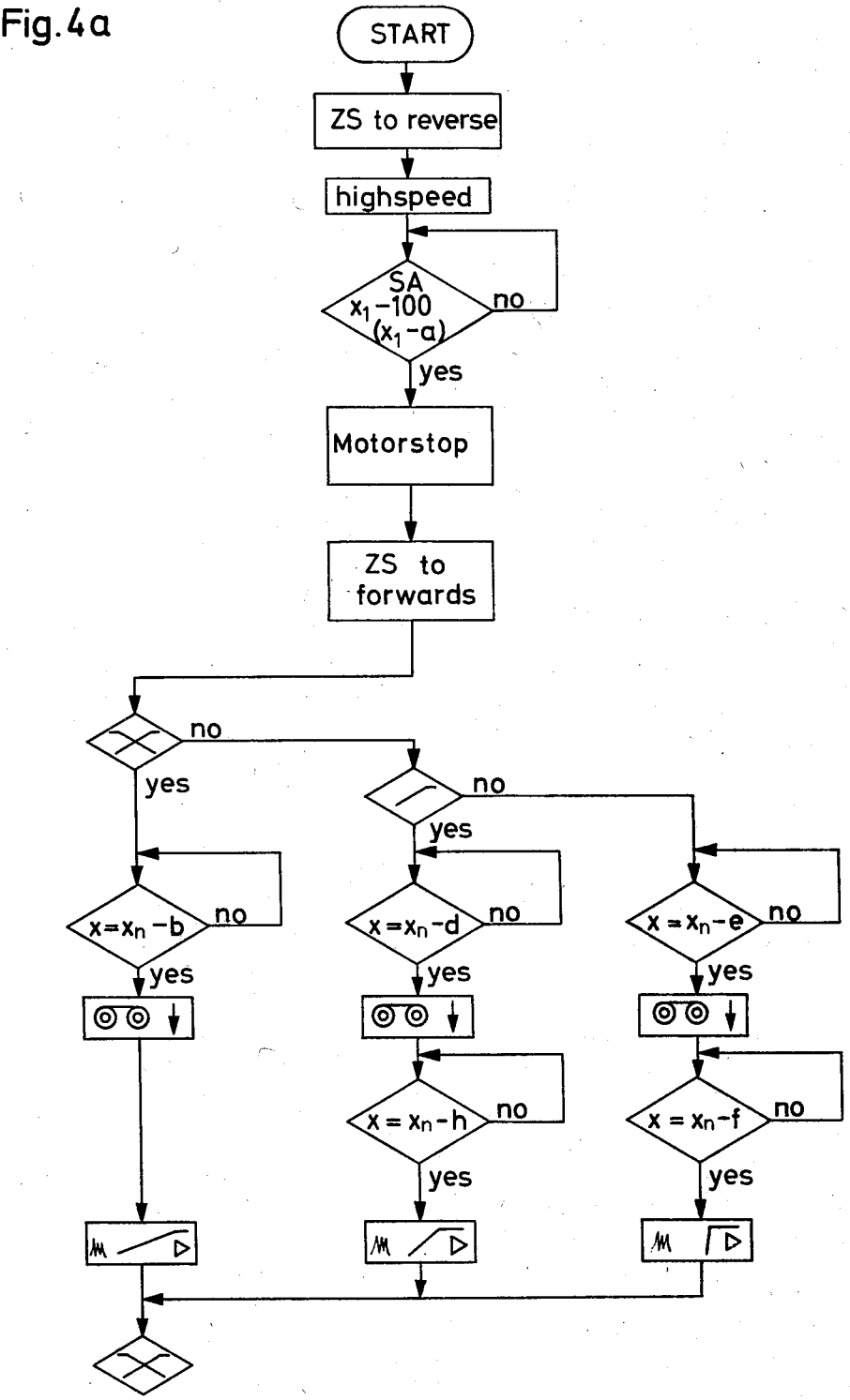
FIGS. 4a, 4b and 5 together depict in flow-chart form the implementation of the programmed operations.
Figure 4B:
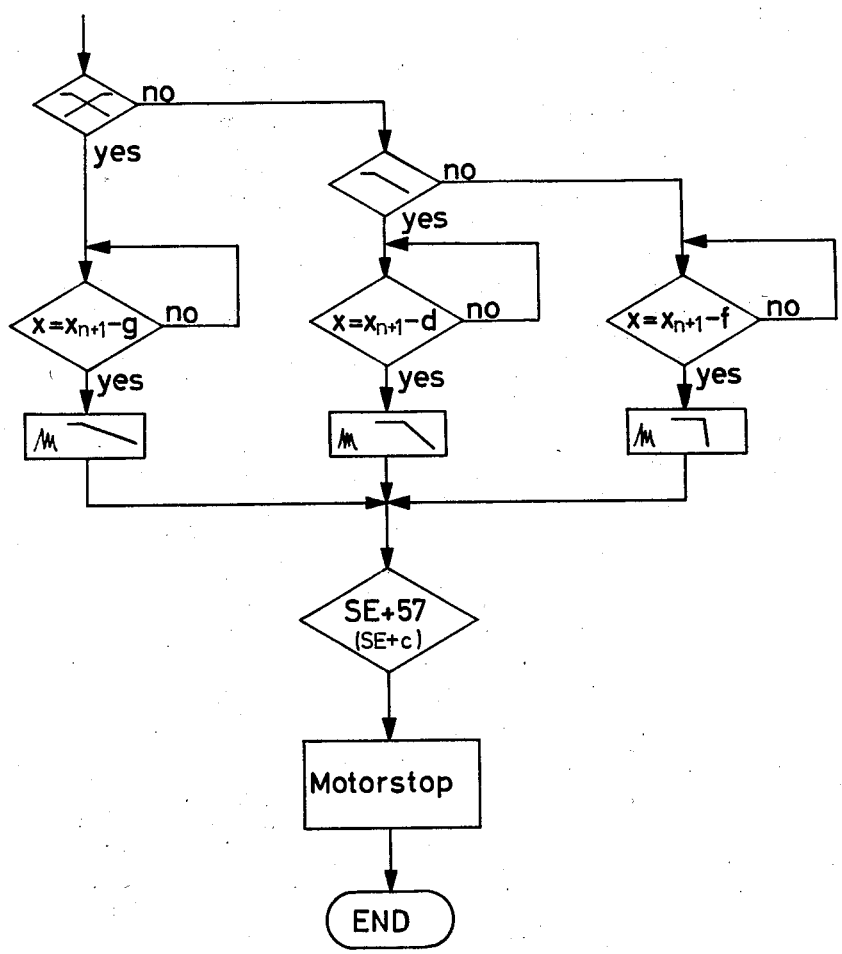
Figure 5:
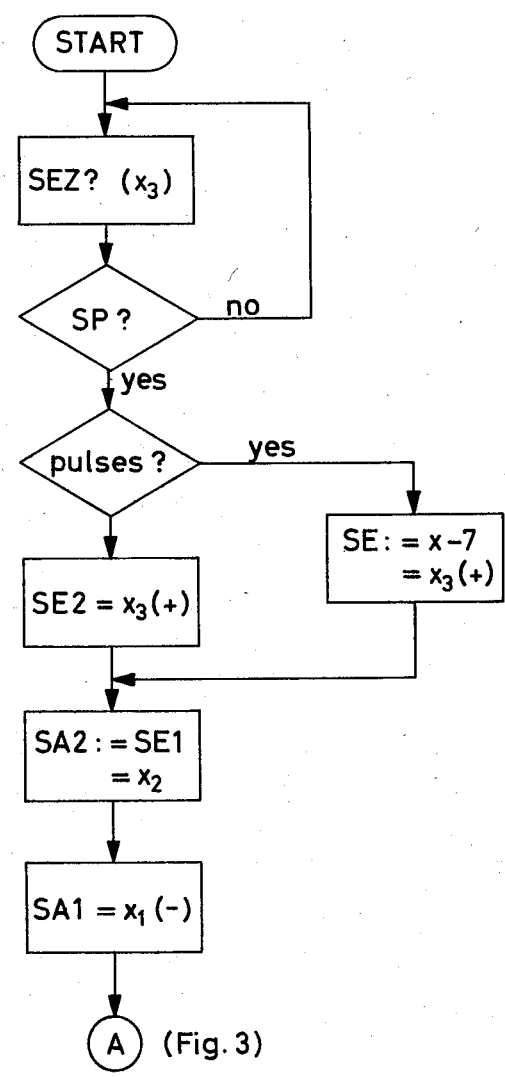

The operation of the illustrated embodiment will be explained with reference to FIGS. 3-5.

For methodical rerecording, a set-up such as depicted in the block schematic diagram of FIG. 2 is sufficient. The magnetic-tape playback machine 19 is connected to the sound film projector 1. After the central switch 13 (ZS) has been turned to setting E (thread-in), the film 5 can be threaded through the projector from the supply reel 3 to the take-up reel 4. When the threading operation has been completed, the operator starts the projector 1 by turning the central switch 13 (ZS) to setting V (forward projection). The film 5 is now transported forwards and projected with unattenuated projection light.

Figure 3A:
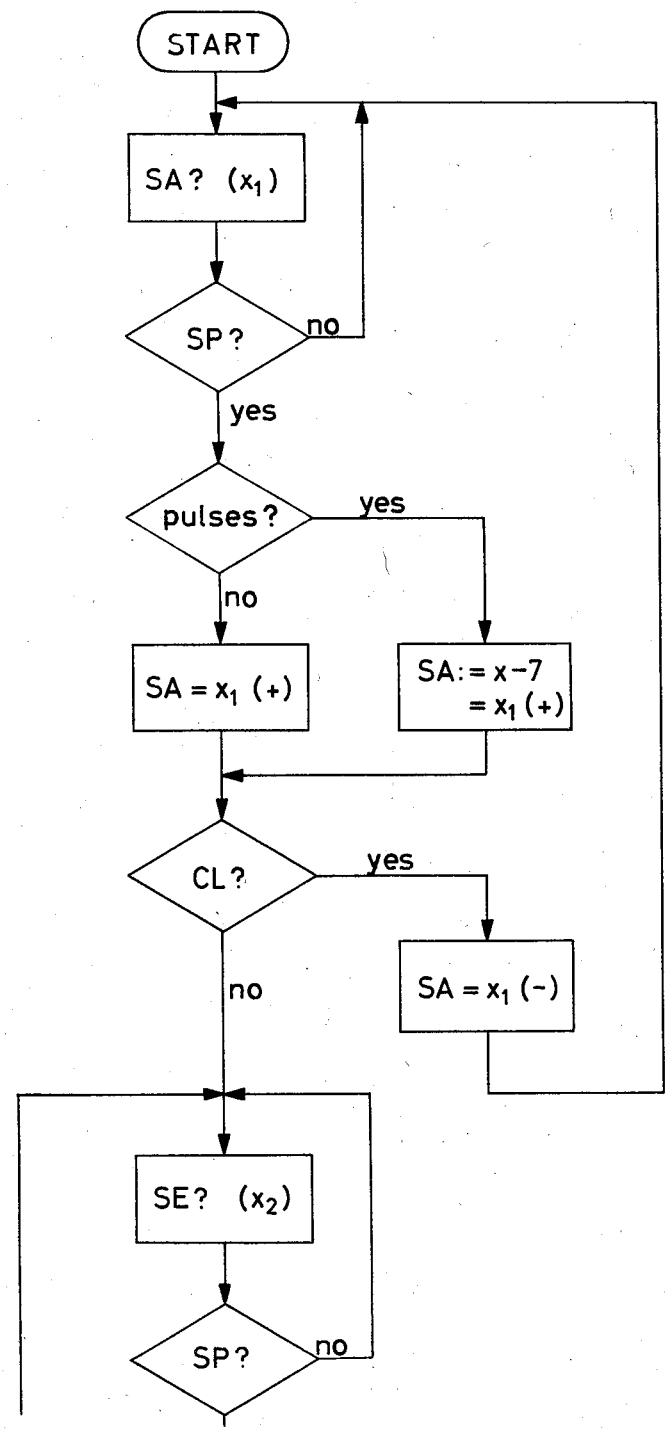
FIGS. 3a and 3b form a flow chart illustrating how the programming of the system is performed.
Figure 3B:
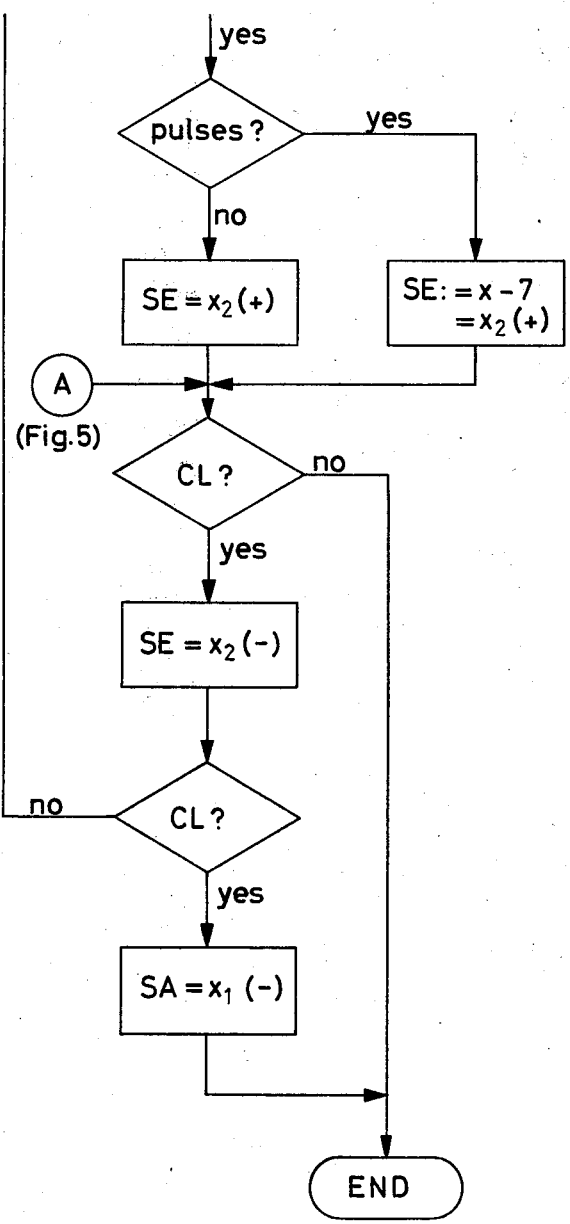

The switching on of the projector 1 by means of the central switch 13 at this step corresponds to the "START" step in the flow chart of FIG. 3. The operator ascertains the start $(SA)=X_1$ of the first scene to be dubbed. As soon as he sees the start of this scene, he activates the switch 33 (SP). The first activation of switch 33 subsequent to projector switch-on causes the frame or film-increment counter 42 to be reset to zero. If, when doing this, the operator inadvertently lets the start of this first scene to be dubbed pass by, then he does not press the switch 33 (SP). Instead, by turning the central switch 13 (ZS) to the setting R (reverse), the operator returns the film to its starting position, after which he returns to forward transport and projection and tries again to cue in the start of the scene. Then, when the start of the scene appears, the operator then presses the switch 33 (SP).

When this is done, the minicomputer then determines whether pulses are being received from the pulse generator 28, and/or whether the central switch is not in its zero setting, i.e., determines whether the film is in transport. If the answer is "yes," then the minicomputer 29, i.e., when the operator has pressed switch 33, stores the scene-start count $x-7=X_1$ (the subtrahend 7 takes into account the number of frames transported during the reaction time of the human operator). Instead of assuming that seven frames pass by during the reaction time of the average operator, it is alternatively possible, as explained below with respect to FIG. 9, to positively ascertain the reaction time for a given operator and to take the ascertained reaction time into account to better determine $X_1$. All this assumes that the operator has pressed switch 33 during forward projection. If, instead, the operator has brought the first frame of the scene into projection position manually, e.g., by manually turning the projector's drive mechanism, then the currently indicated count is directly stored and serves as the scene-start count $(SA)=X_1$. These alternatives are both indicated in the flow chart. If, for any reason, the thusly stored scene-start count does not properly correspond to the operator's wishes, he presses the switch 32 (CL) and the just stored count is erased. The operator then returns central switch 13 to its reverse-transport setting R, and begins over.

To cue in the scene-end count $(SE)=X_2$, the operator turns central switch 13 to the setting V (forward). When the operator sees, during projection of the forwards transported film, that the scene has ended, he immediately presses switch 33 (SP). Alternatively, if the operator has manually brought the last frame in the scene into projection position and the film is not in transport, he likewise presses switch 33 (SP). The minicomputer determines which of these two situations is occurring (the film in transport or not) and then stores a scene-end count directly (if the film was not in transport when switch 33 was pressed) or with the inclusion of a compensatory term taking into account the operator's reaction time (if the film was in transport when switch 33 was pressed). In either event, the scene-end count $(SE)=X_2$ is stored.

Now, if the operator does not activate switch 32 (CL), the programming operation for scene #1 is finished. On the other hand, if for example the operator wishes to more precisely locate the scene end, he presses the switch 32 (CL) and thereby erases the just stored value of $(SE)=X_2$. He then returns central switch 13 to its reverse-transport setting, and then again tries to cue in the scene end. The scene-end count is thusly erased if the operator presses switch 32 (CL) just once. If the operator presses switch 32 (CL) twice, he will also erase the scene-start count $(SA)=X_1$, and the cueing-in of both the scene start and scene end must then be done over.

Now that the start and end of the scene to be dobbed have been cued in, the operator is ready to start the rerecording operation per se. First, he turns central switch 13 to its reverse-transport setting. Because the scene-start and -end counts are stored, this reverse transport is performed at high speed, as indicated in the flow chart (FIG. 4a). The minicomputer 29 terminates this reverse transport immediately upon the reaching of the film location $X_1-a$. a stands for a number of frames, e.g., 100 frames, sufficient to assure that, before the scene start per se is reached, there will be time enough for activation of the components to be involved in the scene-transition effect to be created.

Next, the operator turns central switch 13 to setting V (forwards), and the minicomputer 29 ascertains the setting of the selector switch 12. If selector switch 12 is in its "fadeover" (⤳) setting, then during this forward transport the minicomputer 29 ascertains when the film count $x=X_1-b$ is reached. In the graphical depiction of FIG. 6, this is $X_1-9$. $-b$ thus stands for $-9$ in this example.

Figure 6:
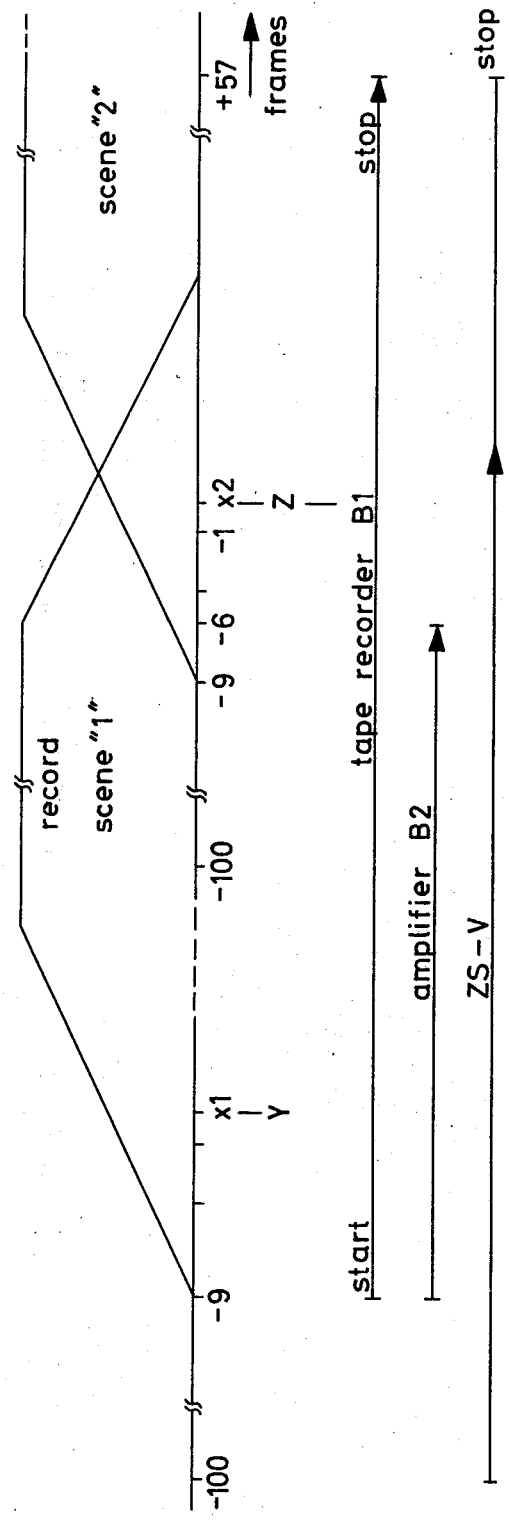
FIGS. 6-8 are graphical depictions of the operations implemented for three different types of recording-transition effects, namely fadeover, hard fade-in and fade-out, and soft fade-in and fade-out, respectively.

As soon as the minicomputer 29 has ascertained that this location has been reached, it starts the tape playback machine 19. If a fadeover effect is being produced (this is what is depicted in FIG. 6), then with the film at this location, the minicomputer also turns on the audio amplifier 40, thereby initiating recording onto the film. Via amplifier 40, sound is faded in and reaches full recording level by about $X_1+9$.

If the setting of selector switch 12 has not meanwhile been changed, the minicomputer 29 waits for the film location $x=X_2-g$, at which the minicomputer issues a fade-out command for the audio amplifier 40. In the example graphed in FIG. 6, $-g=-6$. Thus, the film location at which the fade-out command for the audio amplifier 40 is issued, is $X_2-6$. From that point on, the sound recording is faded out, this fade-out lasting until about $X_2+10$ in FIG. 6. The gradualness of the fade-ins and fade-outs can be implemented, for example, using selectable alternative time-delay stages cooperating with a gain-control input of the recording system of the projector. Although the fade-out has been completed, the film 5 continues to be transported by the projector motor 22. The minicomputer 29 waits for the film location $x=X_2+c$. In the example depicted in FIG. 6, $c=57$. As soon as the minicomputer 29 ascertains that this location on the film 5 has been reached, it issues a stop command for the tape playback machine 19 and furthermore switches off the projector motor 22 and projection lamp 23. The film is now at a standstill, and furthermore at such a location that the scene end (SE) is located at an accessible part of the projector, at which it can be provided with a cutting mark for editing purposes or actually be cut. The film 5 remains in this position, so long as the central switch 13 is not moved to its reverse-transport setting or to for example its zero ("stop") setting and then back to its forward-transport setting. If the operator now wishes to view and listen to the scene just dubbed, or if he decides that he wishes to differently dub it, he turns central switch 13 to its reverse-transport setting. If he does this, then the film 5 is again reverse-transported at high speed back to location $X_1-100$ and then stops. The operator then starts over.

When the operator no longer wishes to view and listen to the scene just dubbed and does not wish to differently dub it, then he goes on and begins to work on the second scene. Specifically, he turns central switch 13 to setting V (forwards) and cues in the end of the second scene (SE 2)=$X_3$. When the operator sees the end of the second scene, he presses switch 33 (SP). As before with the first scene, the minicomputer 29 now ascertains whether the film was in transport or at standstill when the operator pressed switch 33, and then stores the value $X_3$ in the manner described with respect to FIG. 3, i.e., either directly or using the x−7 technique to take into account human reaction time. At the moment that count $X_3$ becomes stored, the value $X_1$ ceases to be stored, and the first-scene scene-end count (SE 1)=$X_2$ now becomes the second-scene scene-srart count (SA 2)=$X_2$. When working on this second scene now, the operator performs the same operations as described above, beginning with step "A" in the flow chart.

Figure 7:
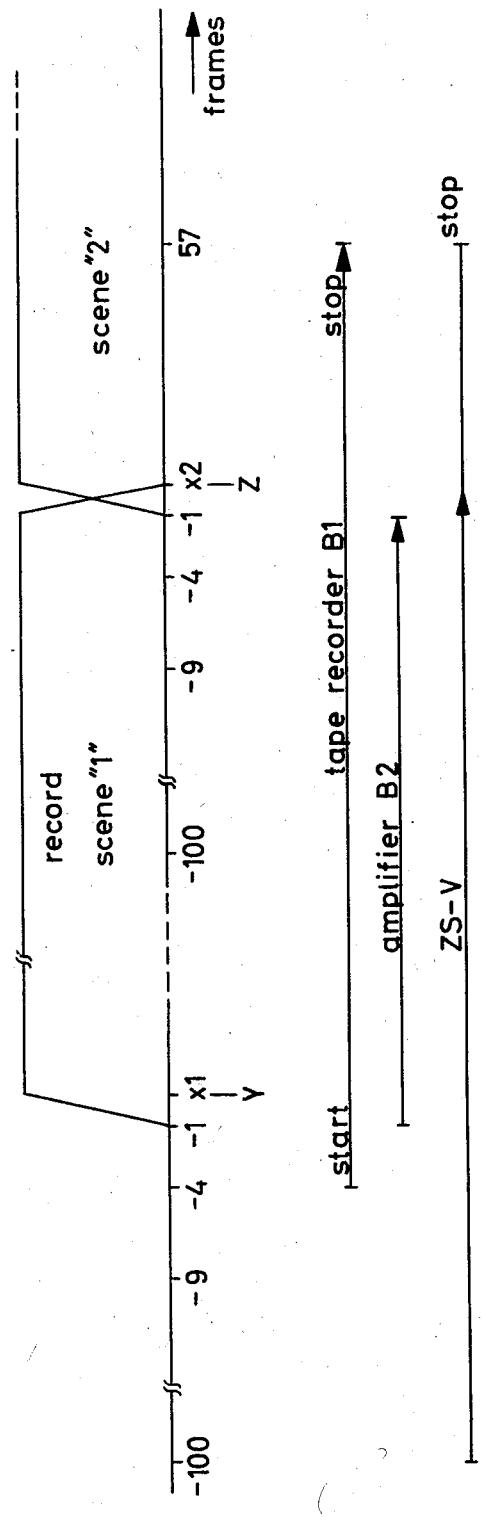

In a manner similar to what has just been described for a normal fadeover, other scene-transition effects can be implemented, depending upon the setting of selector switch 12. FIG. 7 graphically depicts a scene-transition effect with a relatively abrupt fade-in and fade-out.

Figure 8:
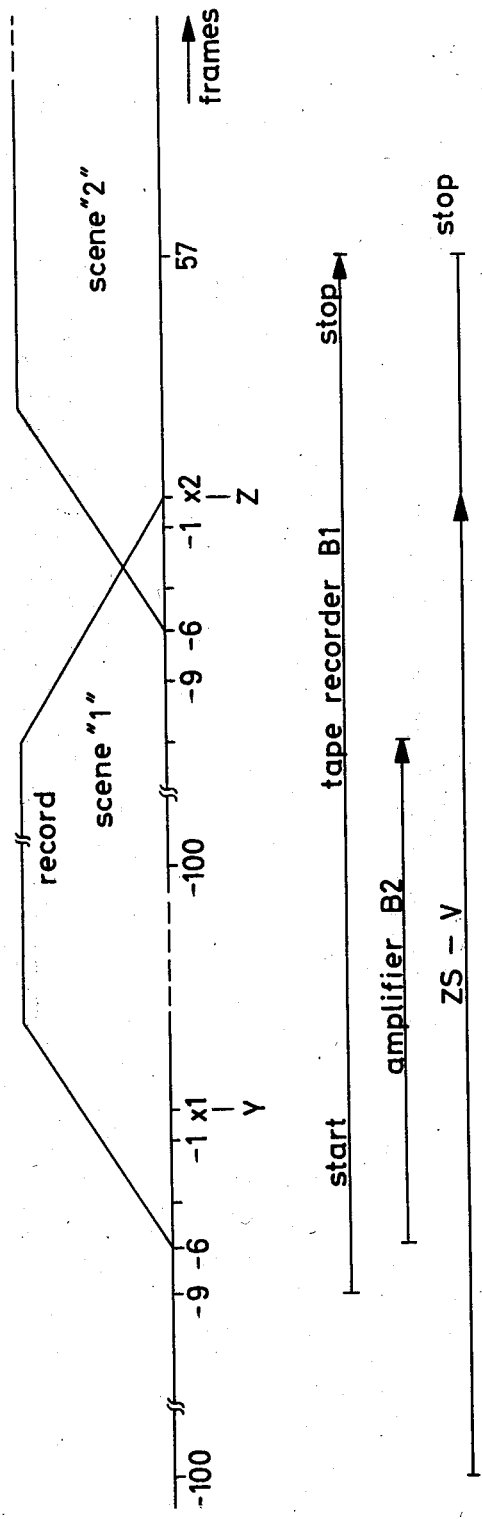

The operator turns the selector switch 12 to the setting which implements this effect, and then turns central switch 13 to its setting V (forwards). During the forward transport, the minicomputer 29 switches on the tape playback machine 19 at film location x=$X_1$−d. In the example graphically depicted in FIG. 7, the playback machine 19 starts to operate at film location $X_1$−4, and at $X_1$−1 the amplifier 40 is switched on, recording is faded-in and recording thereafter continues at full recording level (FIG. 4) until the next scene-transition location is reached. When that location is reached, the recording fade-out can if desired be not abrupt as in FIG. 7 but instead more gradual, as shown in FIG. 8 (and the corresponding flow chart of FIG. 4). If that is to be done, the operator must, before the scene end is reached, turn selector switch 12 to the setting for gradual fade-out (⟍), as a result of which the minicomputer 29, at x=$X_2$−d, in this example $X_2$−19, causes the recording (amplifier 40) to be faded out, this lasting until about $X_2$. Thereafter, the control of the playback machine 19 and of the projector motor 22 occurs in the same way as already described for a fadeover operation (see FIG. 4).

From the foregoing, it will be clear that at each scene start and scene end, one can select from the three different scene-transition effects. Accordingly, the available fade-in and fade-out effects can be variously combined, as desired.

It will be clear that the minicomputer 29 serves as the actual calculating unit for the frame counting system, receiving pulses from pulse generator 28 and causing them to be displayed on frame-count indicator 42.

Figure 9:
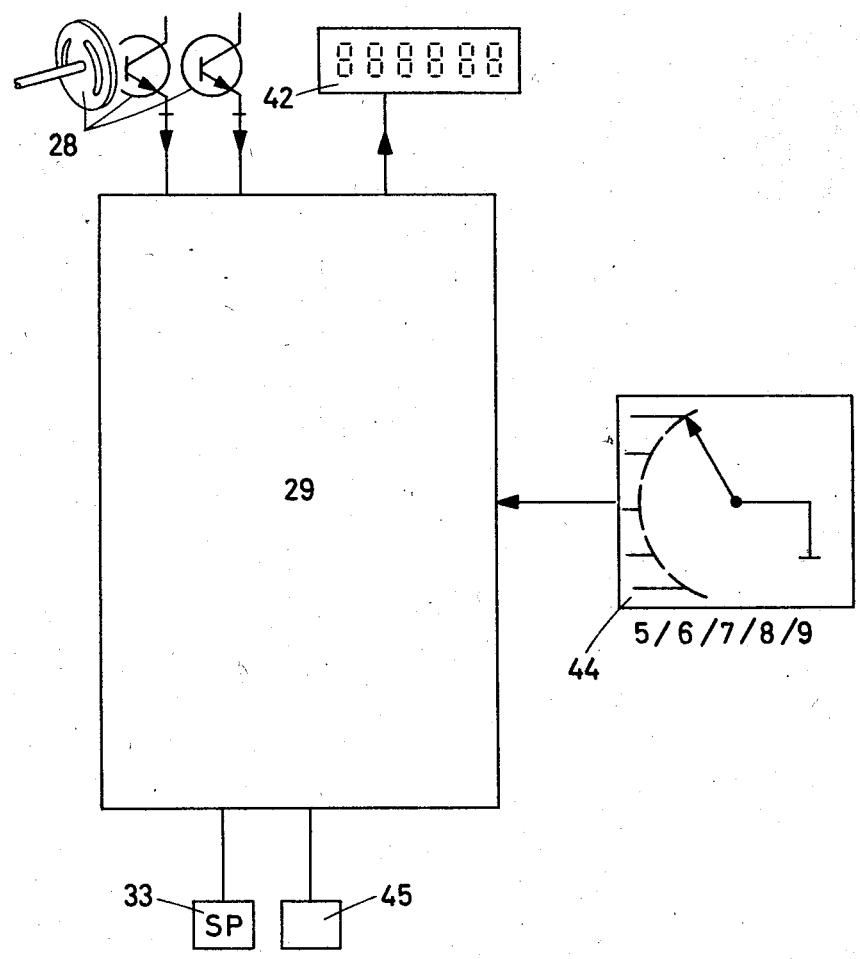
FIG. 9 depicts a modification of part of the system of FIG. 2.

It has already been explained that the cueing in (by means of switch 33) of the scene start and scene end can be performed either with the film at a standstill or in transport, and that in the latter case the minicomputer takes into account a presumed reaction time of the human operator. FIG. 9 depicts a modification of the system, adjustable for more precisely taking into account the particular reaction time of an individual operator. The minicomputer 29 is provided with a manually settable correction-term input unit 44, by means of which the operator positively selects what reaction time the computer should allow for him. The unit 44 can be set to frame-number values 5, 6, 7, 8, or 9, corresponding to how many film frames will be transported within the reaction time interval of the particular operator. Thus, the operator can empirically determine what reaction-time setting best corresponds to the way he actually uses the projector.

Additionally, the modified system of FIG. 9 is provided with a test switch 45. The minicomputer 29 is so programmed as to determine on its own what the reaction time of the operator is. First, the operator very precisely ascertains a scene transition, e.g., by manually advancing the film until the last frame in a scene is in the projection position and then, with the film at a standstill, he presses switch 33 (SP), causing the minicomputer to store the exact frame count for the scene-transition location. Then, the operator rewinds, sets the projector to forward transport, and then during forward transport and film projection presses the test switch 45 immediately upon his viewing of the conclusion of the scene. The minicomputer 29 ascertains this frame count, which is higher because of the operator's non-zero reaction time, and then itself ascertains the difference in the two frame counts and thereby the operator's reaction time, stores this information, and thereafter utilizes this measured time interval for the operator's reaction time.

It is particularly advantageous that the operator be in a position to set up for the cueing-in of scene starts and scene ends during actual film transport and projection. This greatly simplifies his work, enables him to perform his work in a relatively short time, and permits a run-through of the successive scenes at high speed (e.g., normal projection speed) utilizing full projection light.

Second Embodiment

Figure 10:
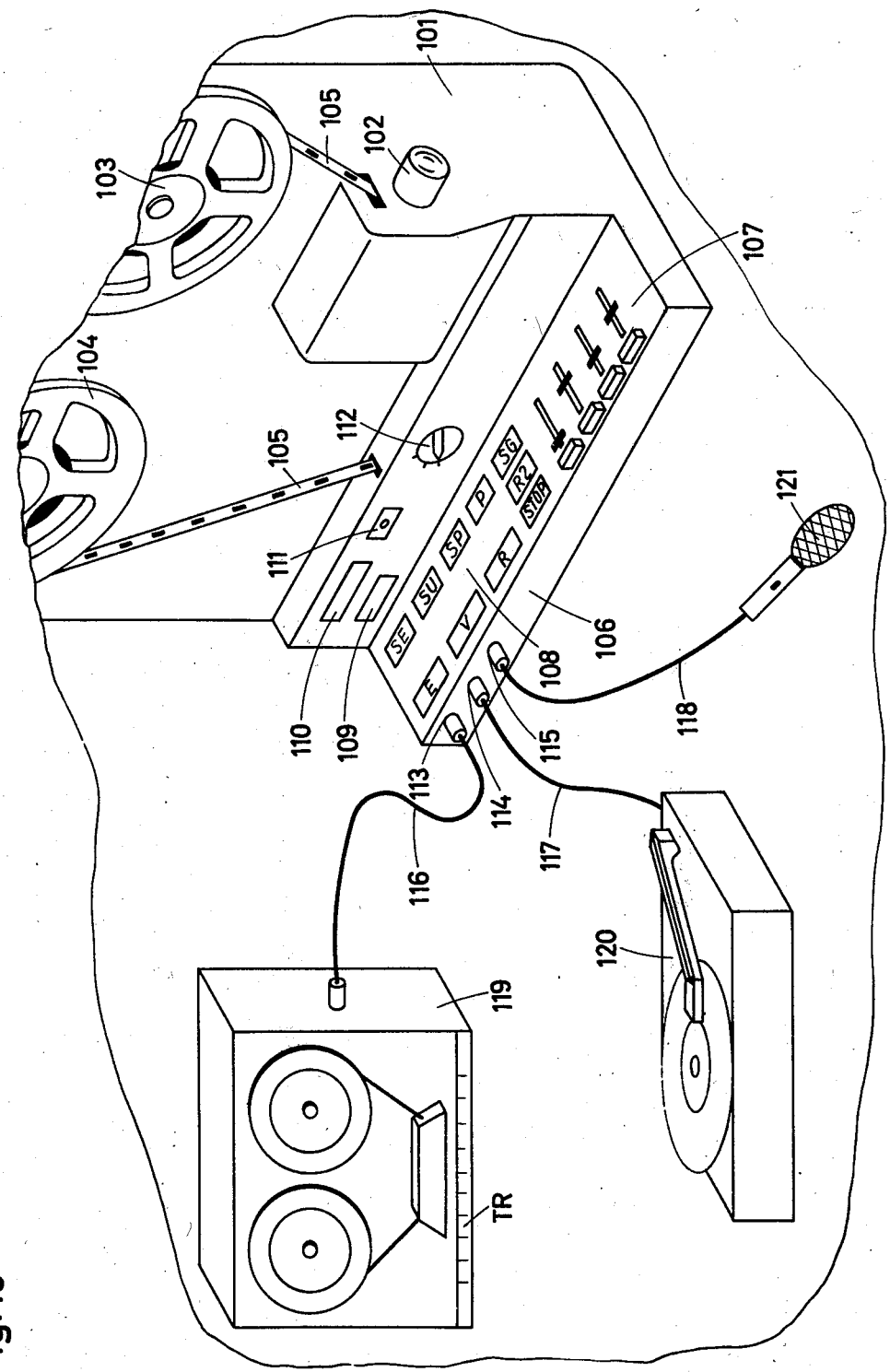
FIG. 10 depicts the interconnected set-up for a second exemplary embodiment, including a sound-film projector, a magnetic-tape playback machine, a phonograph-disk playback machine, and a microphone.

The sound-film projector 101 of FIG. 10 includes an objective 102 and film reels 103, 104 and serves as the playback machine for a film 105. The projector 101 includes a control panel 106, subdivided into a mixing panel 107 for manual control of the recording and playback amplifier of the projector's audio system, and a command panel 108 having a series of operation switches for commanding certain operations. Above the command panel 108, there is provided a viewing window 109 for an audio-level indicator, a viewing window 110 for a frame-count indicator, a zero button 111 for the projector's frame counter, and a selector switch 112. The front face of the projector at its bottom is provided with three inputs 113–115 for rerecording cables 116, 117 and a microphone cable 118. These inputs are used to connect to the projector a magnetic-tape playback machine 119 (TR), a phonograph-disk playback machine 120 and a microphone 121.

Figure 11:
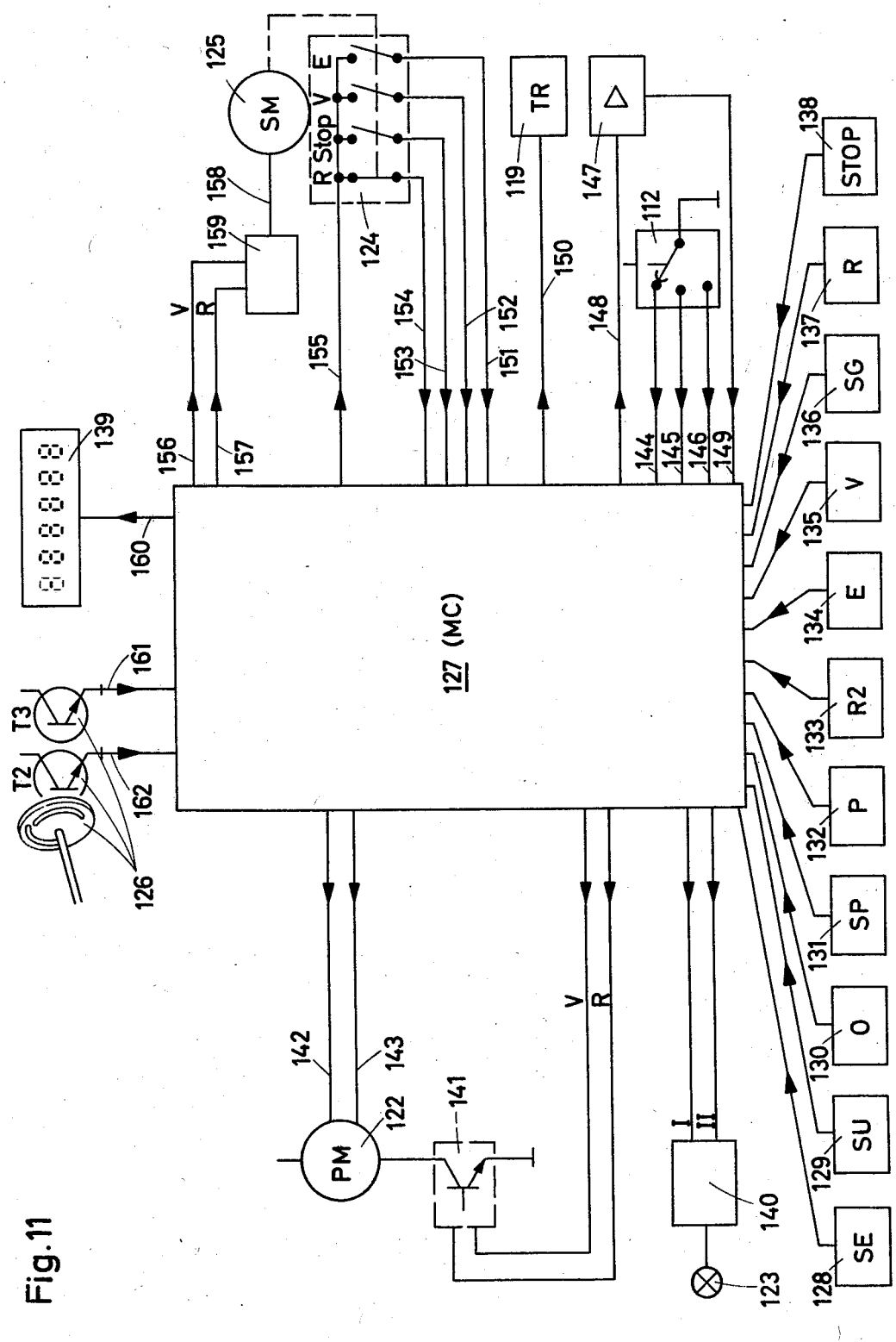
FIG. 11 is a block schematic diagram of the minicomputer of the projector and of its other control and command components.

FIG. 11 depicts components internal to the projector of FIG. 10. These include a projector motor 122 (PM), a projection lamp 123, a central switching and control unit 124 which may, in addition to its other functions, also control mechanical components such as film-loop formers, film-guide plates or the like, and the projector also includes a servomotor 125 (SM) cooperating with unit 124. Additionally, the projector 101 includes a pulse generator 126, for example comprising a photoelectric eye, operative for generating frame or film-increment pulses both during forward and reverse film transport. The central switch unit of the projector 101 is a minicomputer 127 (MC). As shown in FIG. 11, the minicomputer 127 is connected to the operation switches of the command panel 108. These operation switches are associated with the following operations: switch 128 (SE) erase the most recently stored frame count; switch 129 (SU) scene changeover, i.e., go from the current scene to the next; switch 130 (O) set the frame-count indicator 139 to zero; switch 131 (SP) store in the memory unit of minicomputer 127 the current instantaneous frame count, a large number of frame counts being storable within the memory unit; switch 132 (P) after programming-in all the scene-transition counts reset to the starting point ahead of the first scene, or when recording in accordance with the thusly established program go back to a starting point previous to the preceding scene; switch 133 (R2) reverse film transport at 2 frames/second with attenuated projection light; switch 134 (E) film thread-in without projection light; switch 135 (V) forwards transport and projection with full light; switch 136 (SG) fast forward or reverse transport with full projection light; switch 137 (R) reverse transport with attenuated projection light; switch 138 (STOP) stop the projector.

The projection lamp is controlled by the minicomputer 127, via a relay 140 for full light (I) or attenuated light (II).

The projector motor 122 is controlled by the minicomputer 127, via an electronic switch 141, both for forward transport (V) and reverse transport (R). The motor-RPM regulation is performed by the minicomputer 127, via lines 142, 143. Selector switch 112 has three connections 144-146 to the minicomputer 127. These three lines are for the commands "fadeover," "gradual fade-in" and "abrupt fade-in." An audio amplifier 147 is connected to the minicomputer 127 via lines 148 and 149. The connection from the magnetic-tape playback machine 119 (TR) to the minicomputer 127 is effected via line 150.

The central switching and control unit 124 is connected to the minicomputer 127 via lines 151-155. The servomotor 125 for unit 124 is controlled by the minicomputer 127 via lines 156, 157, 158 and a switching unit 159. The frame-count indicator 139 is connected to the minicomputer via a (symbolically indicated) driver stage 160. The pulse generator 126 is connected to the minicomputer 127 via lines 161 and 162.

The operation of this second embodiment will be explained with reference to FIGS. 12 to 14.

For the sake of explanation, it will be assumed that only the magnetic-tape playback machine 119 is plugged into the projector 101. The operator presses the thread-in switch 134 (E), and the film 105 can then be threaded from the supply reel 103 through the projector onto the take-up reel 104. After the film has been properly threaded, the operator starts the projector by pressing switch 135. Film 105 is now transported forwards and projected with full projection light.

Figure 12:
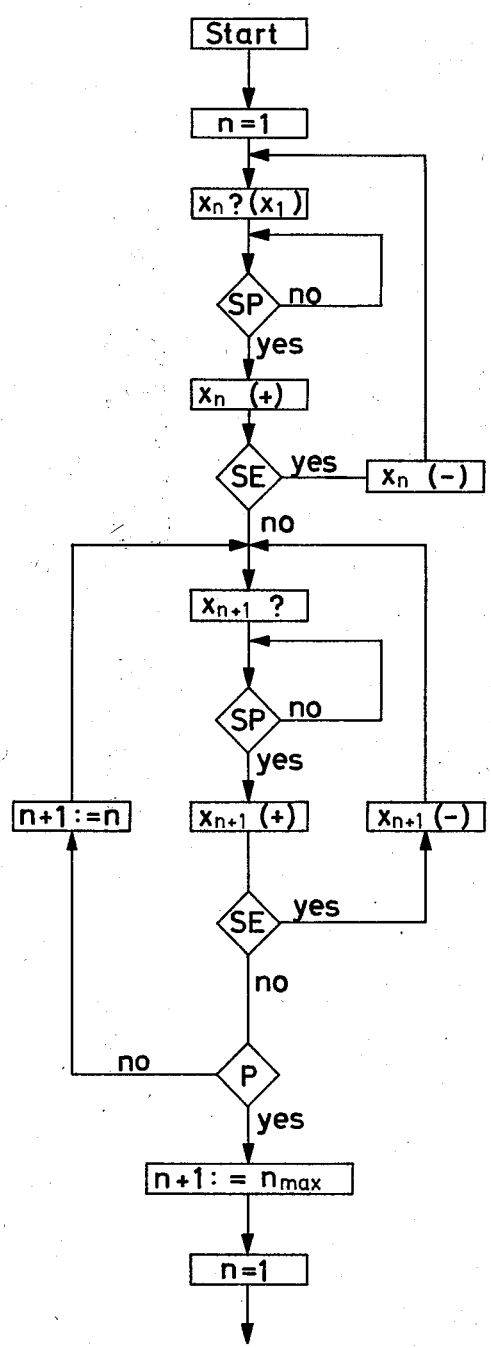
FIG. 12 depicts in flow-chart form how the programming of the system of the second embodiment is performed.

This pressing of switch 135 corresponds to the "START" step in the flow chart of FIG. 12. The film 105 begins to be transported, with the frame which is at that time at the projection position constituting the first frame n=1. The operator then proceeds to ascertain the start ($X_1$) of the first scene to be dubbed.

As soon as the operator sees the start of the first scene, he presses the switch 131 (SP). If the start of the first scene is to correspond to the first frame ($X_1=0$), then the operator must press switch 130 (O) before he starts the forwards transport. In any event, when the operator sees the start of the first scene and presses switch 131, the memory unit of the minicomputer 127 stores the first-scene scene-start frame count ($x_n(+)$). If, after just doing this, the operator changes his mind, he presses switch 128 (SE); this causes the just stored value of $x(x_n(+))$ to be erased ($x_n(-)$).

Next, the operator tries to cue in the end of the first scene. If he overshoots the scene end, e.g., for lack of alertness, it may be necessary for him to switch over into reverse transport and then again into forward transport for a second try, or he can switch over into low-speed reverse transport to find the end of the scene proceeding backwards. In any event, when he finds the end of the first scene, he again activates the switch 131 (SP), whereupon the memory unit of the minicomputer 127 stores the scene-end count ($x_{n+1}(+)$). Here again, if the operator is dissatisfied, he can erase the just-stored count. The operator makes this decision either by pressing the switch 128 (SE), or not. In any event, this count ($x_{n+1}(+)$) will, typically, not only constitute the scene-end count for the first scene but also the scene-start count for the second scene on the film.

Specifically, if the operator does not now press switch 132 (P), then the just-stored count $x_{n+1}$ also becomes the scene-start frame-count $x_n$ for the next scene. Then, for the second scene, the operator proceeds to locate the scene end, and when he does he presses switch 131 (SP).

Proceeding in this way, the frame counts for the starts and ends of all scenes in the film are stored.

When the end of the last scene has been found (n+1:$n_{max}$), i.e., when n+1 goes to $n_{max}$, the operator activates switch 132(P). As a result, the last value $n_{max}$ is stored in the memory of the minicomputer 127 and thereafter reset to n=1. The pre-programming of the scene starts and scene ends is now completed.

Figure 13:
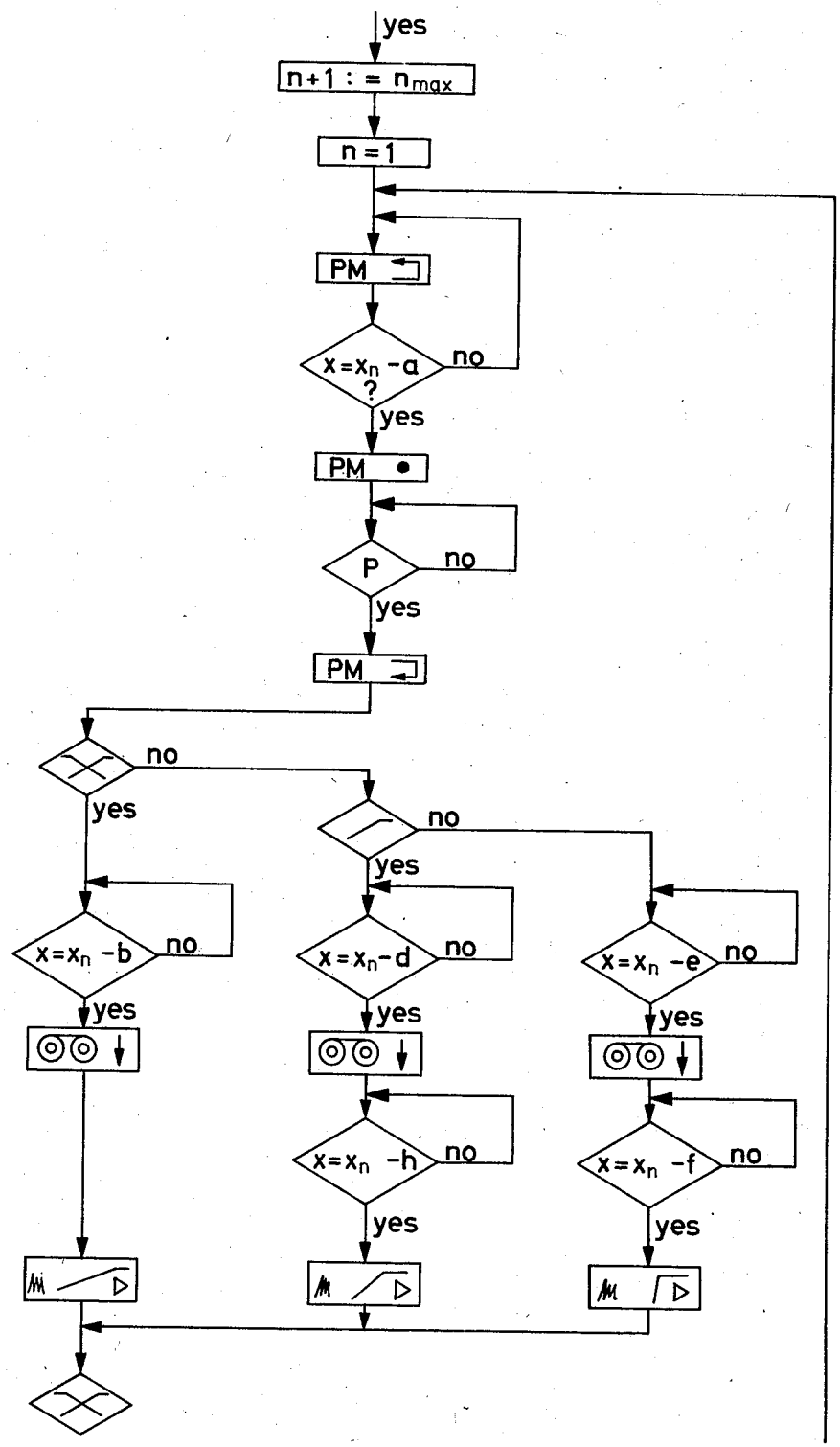
FIGS. 13 and 14 depict in flow-chart form how the implementation of the programmed operations is performed.
Figure 14:
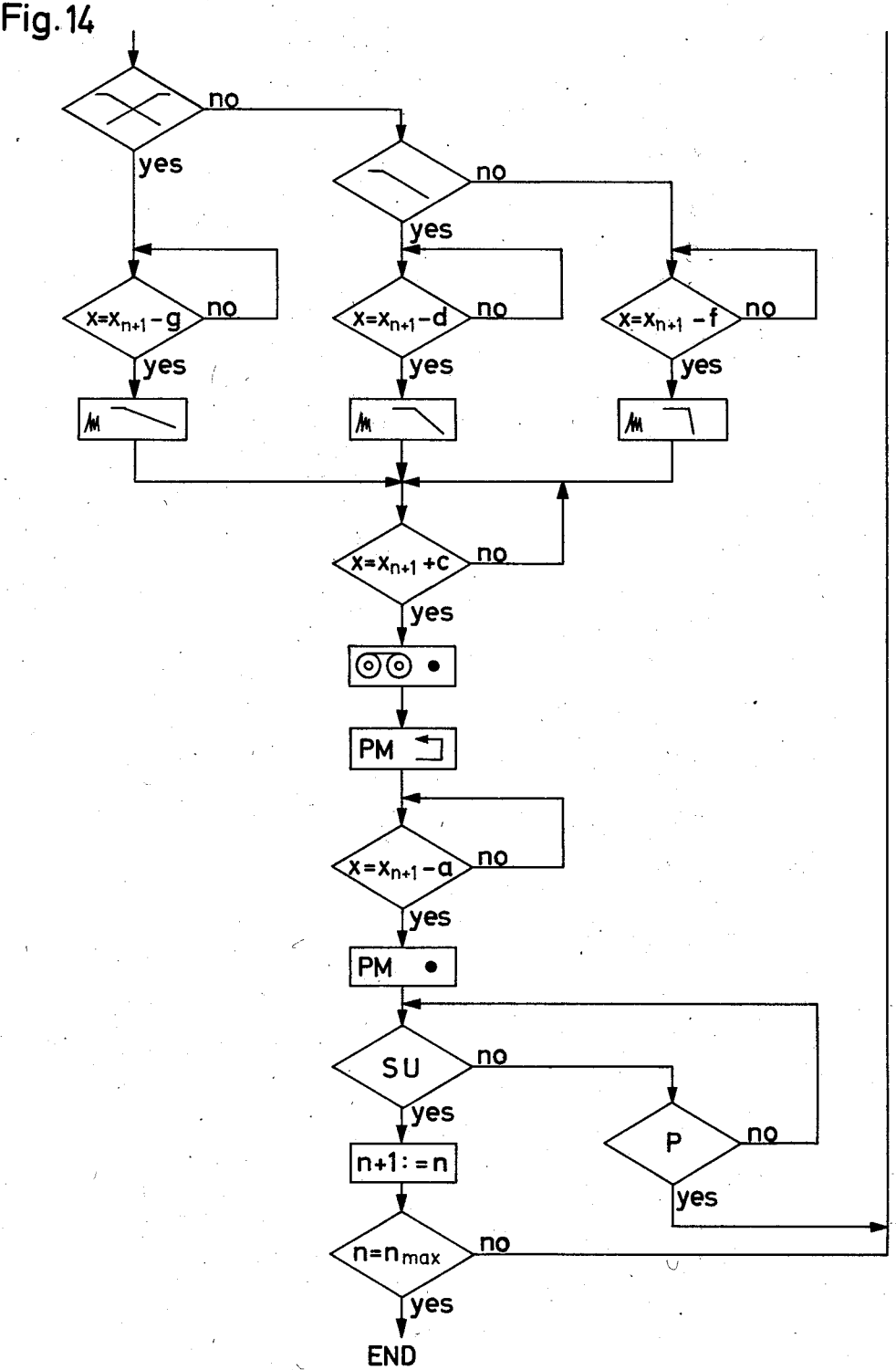

As depicted in the flow charts of FIGS. 13 and 14, to prepare for the actual rerecording, now (i.e., after the operator has pressed switch 132) the projector motor 122 (PM) reverse-transports the film at high speed back to a starting position previous to the start of the first scene to be dubbed. Specifically, the film is reverse transported to the location $x=x_n-a$, in this case $x_1-a$. a stands for a number of frames, e.g., 100 frames, allowing sufficient time between automatic starting and the activation of the individual components to be involved in the implementation of a scene-transition effect.

Figure 15:
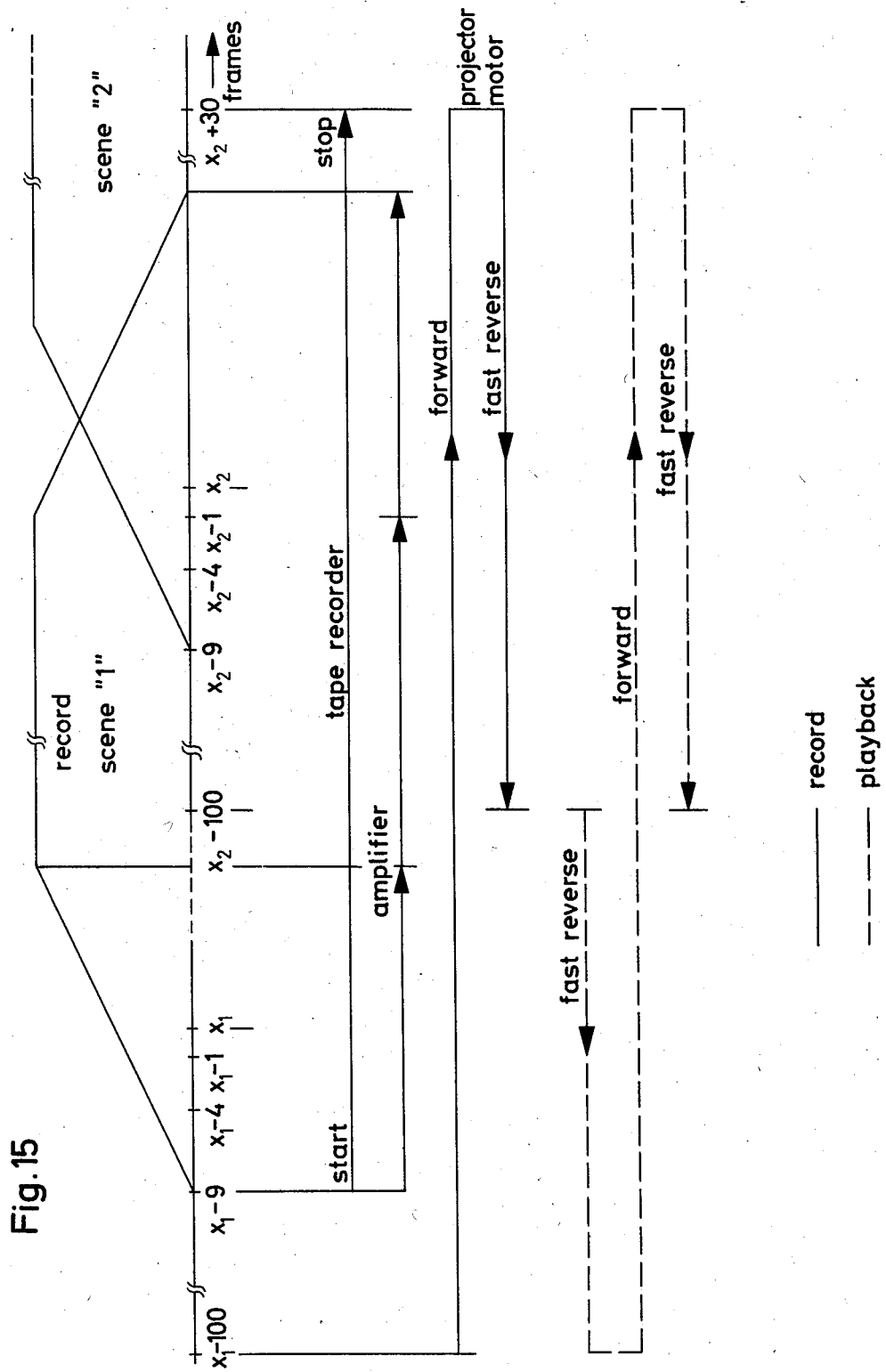
Figure 16:
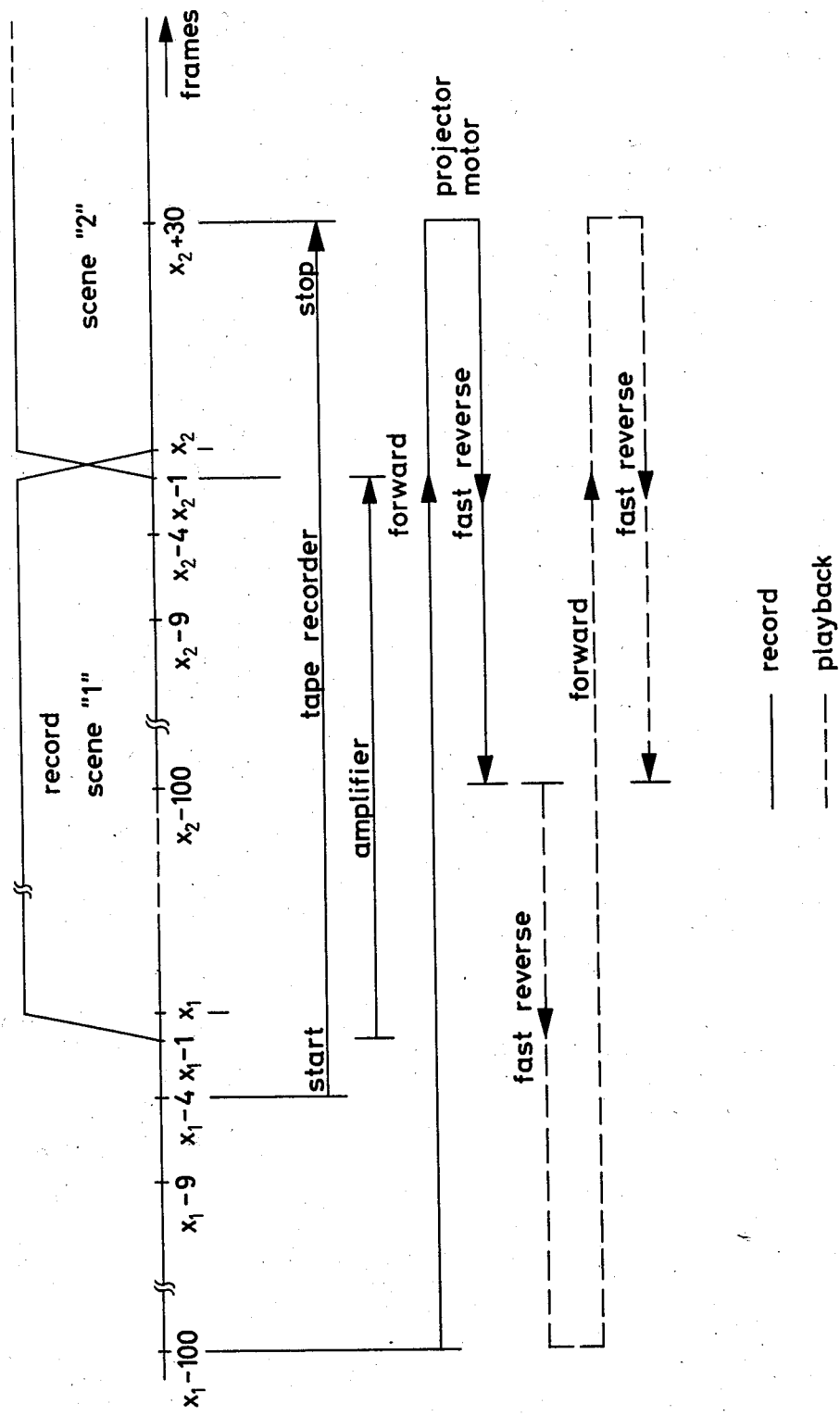

In the graphical depictions of FIGS. 15-17, this starting location is denoted by $x-100$. As soon as the minicomputer ascertains that this location has been reached, the projector motor 122 (PM) is stopped. If now the dubbing of the first scene is to be begun, the operator activates the switch 132 (P). As a result, the projector motor 122 is started up with forward operation (PM). At this point, the minicomputer 127 ascertains what is the setting of selector switch 112. If selector switch 112 is in its normal fadeover setting, then the minicomputer causes the film 105 to be transported until location $x=x_1-b$ is reached. In the illustrative example depicted in FIG. 15, this location is $x_1-9$; i.e., $-b=-9$. As soon as the minicomputer 127 ascertains that this location has been reached, it starts the magnetic-tape playback machine 119.

For a fade-over effect (FIG. 15), this location also constitutes the location at which the recording is to be initiated by switching-on of amplifier 147. By means of the latter, the sound is faded in, the fade-in lasting until about $x_n+9$, at which point the full recording level is reached. Now, if the setting of selector switch 112 has not meanwhile been changed, film transport and full-level recording continue, until the minicomputer 127 detects the reaching of film location $x=x_{n+1}-g$ (FIG. 14), whereupon it issues the fade-out command for the amplifier 147. In the illustrative example of FIG. 15, $-g = -1$. In FIG. 15, $x_{n+1} = x_2$. Thus, the location at which the fade-out command for amplifier 147 is generated is here $x_2 - 1$.

The recording level is faded down now, the fade-out lasting until about $x_2 + 17$. The fade-out can, for example, be implemented using a timing stage which steadily decreases the gain of amplifier 147. Although the fade-out has now been completed, film transport continues until the minicomputer ascertains the reaching of film location $x = x_{n+1} + c$. In FIG. 15, $c = 30$. As soon as minicomputer 127 ascertains that this location has been reached, it stops the playback machine 119. Simultaneously, the projection lamp 123 and the projector motor 122 are shut off, and the minicomputer 127 commands that the servomotor 125 start to operate. The minicomputer 127 now waits for the central switching and control unit 124 to assume its "projector motor reverse" setting. When this setting is reached, minicomputer 127 stops the servomotor 125, and the projector motor 122 switches over to high-speed reverse film transport.

This reverse transport continues until the minicomputer 127 ascertains that the frame count $x = x_{n+1} - a$ has been reached, in the illustrative example $x_2 - 100$, whereupon the projector motor 122 (PM) is stopped. The film 105 remains at a standstill, so long as the operator presses neither the switch 129 (SU) nor the switch 132 (P). If the operator wishes to listen to the effect of what he has just done, or if he wishes to again dub the scene just done, he activates switch 132 (P). The minicomputer 127 then resets previous to the scene start (the start of FIG. 13), the projector motor performing a high-speed reverse transport, until it reaches the location $x = x_n - a$, in the example of FIG. 15, $x_1 - 100$. At that point, the projector motor 122 is stopped. By again pressing the switch 132 (P) and the record button on the projector 101, the already described rerecording operation can be performed anew. The minicomputer 127 brings the film 105 back to the $x_2 - 100$. If the dubbing of the last film scene is satisfactory, the operator presses the switch 129 (SU). As indicated in FIG. 14, then $n+1$ converts to n, i.e., the count for the end of the preceding scene becomes the count for the start of the next scene.

The aforedescribed rerecording operation is performed for all the scenes, until the entire film has been dubbed.

In a manner analogous to what has just been described for fadeovers, other scene-transition effects can be produced. FIG. 16 graphically depicts a scene transition with a relatively abrupt fade-in and fade-out. The operator turns selector switch 112 to the setting for this effect, and then presses switch 132 (P). The minicomputer 127 initiates forward transport, and ascertains when the film location $x = x_n - d$ has been reached, whereupon it starts the magnetic-tape playback machine 119. In the example of FIG. 16, the playback machine 119 starts at $x_1 - 4$. At $x_n - f = x_1 - 1$, the amplifier 147 is switched on and the recording of sound is initiated and continues until the next scene transition is reached. At that point, instead of the hard fade-out shown in FIG. 16, it would also be possible to implement a soft fade-out such as shown in FIG. 17 (FIG. 14). If that is desired, the selector switch 112 must be turned into its middle setting (gradual fade-out ⟍) before the scene end is reached. If that is done, then the minicomputer 127, at $x = x_{n+1} - d$, in this example $x_2 - 19$, causes the recording (amplifier 147) to fade out, this lasting until about $x_2$. Thereafter, the magnetic-tape playback machine 119 and the projector motor 122 are controlled in the manner already described for a normal fadeover operation (see FIG. 14). From the foregoing, it will be clear that for each individual scene start or scene end, the operator can select from any one of the three different settings of the selector switch 112. In other words, the operator can make any combination of the available fade-in and fade-out effects which he may desire.

To facilitate understanding, the graphical depictions in FIGS. 15–17 indicate the RECORD phase in solid lines, and the PLAYBACK phase in broken lines.

It will be understood that each of the elements described above, or two or more together, may also find a useful application in other types of circuits and constructions differing from the types described above.

While the invention has been illustrated and described as embodied in a particular kind or rerecording context, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of automatically producing fade-in, fade-out or fadeover recording effects at predetermined recording transition locations on a film comprised of a series of film frames using a reproduction machine capable of transporting the film both forwards and backwards and reproducing the images on the film frames, counting means capable of counting frames during both forward and reverse film transport, and programmable control means capable of storing frame counts, the method comprising causing the counting means to feed into the control means information in the form of frame counts identifying the predetermined recording-transition locations on the film; then effecting forwards transport of a predetermined section of the film which includes two of the scene-transition locations and is adjoined by at least one further film section which shares a transition location therewith, causing the control means to count the increments of film during such transport and in dependence thereon and in dependence upon a preestablished program of the control means effecting a recording fade-in at the first transition location of the predetermined film section and a recording fade-out at the second transition location thereof and the termination of film transport upon the completion of the fade-in and fade-out operations, utilizing the stored counts as reference values for the programmed fade-in, fade-out and transport termination.

2. The method defined in claim 1, the stored counts identifying scene-transition locations of a series of scenes, the method furthermore comprising the step of first rewinding the film back to its starting position before and step of effecting the forwards transport, and during the forwards transport of the predetermined film section generating film-increment pulses, counting the pulses, effecting the fade-in and the fade-out in dependence upn the count using count-responsive means, and after effecting the fade-out reversing the transport direction of the film to move the film back to a location previous to the second transition location, then switching over into forwards transport and thereafter beginning the processing of the next-following film section.

3. The method defined in claim 2, programming the control means to stop film transport indefinitely before the switching over into forwards transport for the processing of the next following film section.

4. The method defined in claim 2, the processing of the next-following film section being performed in the same way as defined above for the film section preceding it.

5. The method defined in claim 1, the reproduction machine being a projector, the feeding in of the counts comprising transporting and projecting the film, visually monitoring the moments when transition locations are being projected, at each such moment immediately manually activating a storage switch causing the memory of the programmable control means to store the current count, and programming the control means to automatically subtract from each such count a value compensating for the non-zero reaction time elapsing between projection of a transition location and manual activation of the storage switch.

6. The method defined in claim 5, permanently programming the control means to automatically subtract always the same value, to thereby compensate for a presumed invariable reaction time.

7. The method defined in claim 5, programming the control means to automatically subtract the compensatory value as follows: causing the projector to project a film portion corresponding to a transition location with the film at a standstill, then causing the memory of the control means to store the corresponding count, then forwards transporting the film so that the same transition location is again projected, visually observing the projected image during such forward transport and when the transition location is projected immediately manually activating a test switch, and programming the control means to automatically evaluate the discrepancy between the count produced with the transition location at a standstill and with the film in forwards transport.

8. The method defined in claim 5, setting the value to be subtracted from the count by means of a selector device.

9. The method defined in claim 1, the reproducing machine being a film projector, the automatic termination of the forwards transport after the passing by of the second transition location occurring after the counted number of frames has increased to a value such that the second transition location has been transported from the projection location of the projector to a part of the projector at which the second transition location is physically accessible for the application of a cutting mark or for actual cutting.

10. The method defined in claim 1, after storing the transition-location frame counts manually switching the reproducing machine to reverse transport, and programming the control means to automatically stop this reverse transport when the frame count reaches a value lower by a predetermined amount than the lowest one of the stored frame counts.

11. The method defined in claim 1, the recording being audio recording, effecting the recording using an audio playback machine having an output feeding into an audio input of the reproducing machine for the film, programming the control means to automatically switch on the playback machine prior to start of the fade-in and to automatically switch off the playback machine subsequent to the completion of the fade-out.

12. The method defined in claim 1, the recording being audio recording, effecting the recording using two audio playback machines each having an output feeding into an audio input of the reproducing machine for the film, and programming the control means to cause one playback machine to be automatically switched off and the other automatically switched on during transport of a transition location without stopping the film.

13. The method defined in claim 1, using selecting means to select in advance whether a fade-in, a fade-out or a fadeover recording effect is to be produced, and making such a selection during reproduction of a transported portion of the film intermediate two transition locations.

14. The method defined in claim 1, using selecting means to select whether a fade-in, a fade-out or a fadeover recording effect is to be produced, and making these selections at the same times that the transition-location frame counts are fed into the control means.

15. The apparatus defined in claim 1, the reproduction machine being provided with indicating means for indicating to the operator what film section is located within the reproduction station of the reproduction machine at any given time.

16. An apparatus for automatically producing fade-in, fade-out or fadeover recording effects at predetermined recording-transition locations on a film comprised of a series of film frames, comprising, a reproduction machine including a transport motor capable of transporting the film both forwards and backwards and reproducing the images on the film frames and including recording means operative for receiving and recording information onto the film, control means comprising a minicomputer operative for counting frames during both forward and reverse film transport and for storing frame counts identifying the predetermined recording-transition locations on the film, and command means comprising operator-activated operation switches activatable by the user for causing the control means to store frame counts identifying transition locations, and for causing the control means to control the recording means and automatically implement preselected recording-transition effects at the recording-transition locations, and for causing the control means to control the transport motor to effect forward and reverse transport of the film during recording and implementation of recording-transition effects.

17. The apparatus defined in claim 16, the minicomputer including a forwards-backwards counter, and further including a pulse generator operative for generating pulses corresponding to film-length increments during film transport and applying such pulses to the forwards-counting input of the counter during forwards film transport and to the backwards-counting input of the counter during reverse film transport.

18. The apparatus defined in claim 16, the operation switches including selector switch means for selecting recording-transition effects of differing types.

19. The apparatus defined in claim 16, the control means furthermore including a central switching and control unit having a plurality of settings and operative in dependence upon its setting for generating signals commanding the performance of operations by mechanical components of the reproduction machine, a servomotor coupled to the central switching and control unit for changing the setting of the latter and connected to and controlled by the minicomputer.

20. The apparatus defined in claim 16, the minicomputer being programmed to automatically terminate forwards film transport after the implementation of a fade-in effect at one transition location and of a fade-out effect at the next transition location and then wait for a manually generated reverse-transport command signal from the operator, then in response to this command signal implementing reverse film transport and then automatically terminating the reverse film transport in dependence upon stored frame count information at a film location whose frame count is lower by a predetermined amount than the lowest stored transition-location frame count.

21. The apparatus defined in claim 16, the minicomputer being capable of storing only two transition-location frame counts respectively constituting the start and end frame counts of a limited section of the film, and being programmed such that for the next-following film section the start frame count is erased and the end frame count is converted into the start frame count for such next-following film section.

22. The apparatus defined in claim 16, the minicomputer being programmed to respond to a manually generated erase command by erasing the most recently stored one of the transition-location frame counts.

23. The apparatus defined in claim 16, the minicomputer being programmed to automatically shut off at least predetermined components of the apparatus when the operator has not manually commanded shut-off but the minicomputer detects that frames are no longer being counted.

24. The apparatus defined in claim 16, the minicomputer being programmed to automatically reset the frame count to zero after switch-on of the apparatus the first time that the operator manually commands the storage of a transition-location frame count.

25. The apparatus defined in claim 16, the minicomputer being programmed to automatically implement a high-speed reverse transport of the film as soon as a transition-location frame count has been stored.

26. The apparatus defined in claim 16, the minicomputer being programmed to respond to predetermined commands manually generated by the operator by automatically implementing operations corresponding to only a part of the complete program of operations programmed into the minicomputer, and programmed to respond to predetermined commands manually generated by the operator for automatically implementing individual respective commanded operations and storing information concerning what operation has been commanded.

27. The apparatus defined in claim 16, the minicomputer being programmed to automatically implement a manually generated command that a selected scene be retransported and to automatically implement a manually generated command that the film transport continue onto the next scene on the film.

28. The apparatus defined in claim 16, the operation switches comprising depressible keys.

* * * * *